United States Patent
Liu et al.

(10) Patent No.: US 12,431,950 B2
(45) Date of Patent: Sep. 30, 2025

(54) CHANNEL RECIPROCITY-BASED PRECODING MATRIX CONFIGURATION METHOD AND APPARATUS

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN); Hui Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/404,856

(22) Filed: Jan. 4, 2024

(65) Prior Publication Data

US 2024/0146364 A1    May 2, 2024

Related U.S. Application Data

(63) Continuation of application No. 17/785,399, filed as application No. PCT/CN2020/134269 on Dec. 7, 2020, now Pat. No. 11,901,979.

(30) Foreign Application Priority Data

Dec. 30, 2019  (CN) .......................... 201911404709.7

(51) Int. Cl.
*H04B 7/04* (2017.01)
*H04B 7/0456* (2017.01)
*H04B 7/06* (2006.01)
*H04L 5/00* (2006.01)

(52) U.S. Cl.
CPC ......... *H04B 7/0456* (2013.01); *H04B 7/0617* (2013.01); *H04B 7/0626* (2013.01); *H04B 7/063* (2013.01); *H04B 7/0632* (2013.01); *H04L 5/0048* (2013.01)

(58) Field of Classification Search
CPC .. H04B 7/0456; H04B 7/0617; H04B 7/0626; H04B 7/063; H04B 7/0632; H04L 5/0048
See application file for complete search history.

(56) References Cited

U.S. PATENT DOCUMENTS

| | | | |
|---|---|---|---|
| 11,695,462 B2* | 7/2023 | Raghavan ............. | H04L 5/0023 370/329 |
| 2014/0177745 A1* | 6/2014 | Krishnamurthy ...... | H04B 7/063 375/267 |
| 2016/0119097 A1* | 4/2016 | Nam ..................... | H04L 5/0048 370/329 |

(Continued)

*Primary Examiner* — Freshteh N Aghdam
(74) *Attorney, Agent, or Firm* — KILPATRICK TOWNSEND & STOCKTON LLP

(57) ABSTRACT

Disclosed are a channel reciprocity-based precoding matrix configuration method and apparatus. The method includes in downlink transmission, a network side separately sends, on each antenna port associated with each transmission layer, a CSI-RS subjected to beamforming to a terminal by using beams calculated according to angle information and delay information determined on the basis of uplink channel state information, and determines a precoding matrix for downlink transmission of the terminal according to beams sent on K0 antenna ports selected by the terminal on the basis of the CSI-RS, and a beam combination coefficient set.

20 Claims, 3 Drawing Sheets

(56) References Cited

U.S. PATENT DOCUMENTS

2017/0311296 A1* 10/2017 Onggosanusi ....... H04B 7/0456
2020/0076490 A1*  3/2020 Onggosanusi ........ H04L 5/0053
2020/0358509 A1* 11/2020 Wernersson .......... H04L 5/0051

* cited by examiner

CHANNEL RECIPROCITY-BASED PRECODING MATRIX CONFIGURATION METHOD AND APPARATUS

CROSS REFERENCE TO RELATED APPLICATIONS

The present application is a continuation of U.S. patent application Ser. No. 17/785,399, filed on Jun. 15, 2022, which is a National Stage of International Application No. PCT/CN2020/134269, filed on Dec. 7, 2020, which claims priority to the Chinese Patent Application No. 201911404709.7, filed to the Chinese Patent Office on Dec. 30, 2019 and entitled "CHANNEL RECIPROCITY-BASED PRECODING MATRIX CONFIGURATION METHOD AND APPARATUS", the entire contents of which are incorporated herein by reference.

FIELD

The present application relates to communication technologies, in particular to a channel reciprocity-based precoding matrix determination method and apparatus.

BACKGROUND

In a new radio (NR) system, as for a Type II codebook, Rel-15 or Rel-16 respectively defines a port selection codebook and an enhanced port selection codebook by using angle information reciprocity in an uplink channel and a downlink channel (namely, angle information of the uplink channel can serve as angle information of the downlink channel).

In the NR Rel-16, an enhanced Type II codebook is defined and can support Rank=1~4, which realizes port selection through a port selection matrix (marked as: W1) and realizes linear combination between ports in a mode same as a Type II codebook of the Rel-16. Each channel state information-reference signal (CSI-RS) port is subjected to beamforming, and its formed beams can be determined through reciprocity of angle information of the uplink channel and the downlink channel. W1 is represented as:

$$W_1 = \begin{bmatrix} E_{\frac{X}{2} \times L} & 0 \\ 0 & E_{\frac{X}{2} \times L} \end{bmatrix}.$$

In one embodiment, X is a total quantity of CSI-RS ports, where a value of X is the same as configuration of antennas supported by the enhanced Type II codebook in the NR Rel-16. L is a quantity of configurable CSI-RS ports, and L∈{2, 4}. A configuration state of the CSI-RS ports may be represented as:

$$E_{\frac{X}{2} \times L} = \begin{bmatrix} e_{mod(md,\frac{X}{2})}^{(\frac{X}{2})} & e_{mod(md+1,\frac{X}{2})}^{(\frac{X}{2})} & \cdots & e_{mod(md+L-1,\frac{X}{2})}^{(\frac{X}{2})} \end{bmatrix}.$$

In one embodiment, $$e_i^{(\frac{X}{2})}$$

represents a vector with a length being X/2; i represents a serial number of CSI-RS ports; an $i^{th}$ element is 1 and other elements are 0; m represents a serial number of a starting CSI-RS Dort among L selected continuous CSI-RS ports, a value of m is:

$$m \in \left\{0, 1, \ldots, \left|\frac{X}{2d}\right| - 1\right\},$$

using a broadband feedback; d represents a preset sampling interval, d ∈{1,2,3,4}, an d≤L is used for adjusting a sampling interval between every L beams and affecting feedback overhead, and meanwhile selection of d needs to consider to avoid selecting beams with the similar directions for linear combination.

As for selected L CSI-RS ports, the port selection codebook is worked out by using a Type II codebook structure of Rel-16. By taking Rank=1 for example, the Type II codebook structure of Rel-16 may be written as:

$$W = W_1 \tilde{W}_2 W_f^H.$$

In one embodiment, W is a precoding matrix of X×N₃, N₃ represents a quantity of a precoding matrix indicator (PMI) sub-bands; $W_f$ represents a frequency domain basis vector, which is composed of M Discrete Fourier Transform (DFT) vectors, and a terminal determines a set of M DFT base vectors according to a parameter M configured by a base station; $\tilde{W}_2$ represents a linear combination coefficient after compressing N₃ PMI sub-band coefficients to which beams of 2L selected CSI-RS ports respectively correspond by using $W_f$.

However, in the related art, when the terminal adopts the enhanced Type II port selection codebook in NR Rel-16, singular value decomposition (SVD) calculation is needed for effective channel information of each PMI sub-band, thus consequently calculation complexity and feedback overhead of the terminal are increased.

In view of this, a new precoding method needs to be designed to overcome the above defects.

SUMMARY

An embodiment of the present application provides a channel reciprocity-based precoding matrix determination method, to effectively lower calculation complexity of a terminal and reduce feedback overhead of the terminal.

A specific solution provided by the embodiment of the present application is as follows.

In one embodiment, a channel reciprocity-based precoding matrix configuration method includes: sending, by a network side in downlink transmission, a corresponding channel state information-reference signal (CSI-RS) subjected to beamforming to a terminal separately on respective antenna ports associated with respective transmission layers, and a beam used while sending the CSI-RS on an antenna port is obtained according to angle information and delay information determined on the basis of uplink channel state information of the terminal, and beams used while sending CSI-RSs separately to the terminal on the respective antenna ports are independent and different; receiving, by the network side, K0 antenna ports and a beam combination coefficient set reported by the terminal, and the K0 antenna ports are selected by the terminal on the basis of respective received CSI-RSs, the beam combination coefficient set is obtained by calculation on the basis of the CSI-RSs received on the K0 antenna ports, and K0 is an integer greater than zero; and as for the terminal, determining, by the network side, a precoding matrix of downlink transmission of the terminal according to the beams used while sending the CSI-RSs on the K0 antenna ports and the beam combination coefficient set.

In one embodiment, before the sending, by the network side in downlink transmission, the corresponding CSI-RS subjected to beamforming to the terminal separately on the respective antenna ports associated with the respective transmission layers, the method further includes: receiving, by the network side, a sounding reference signal (SRS) sent by the terminal; calculating, by the network side, corresponding uplink channel state information on the basis of the SRS; determining, by the network side, angle information and delay information of each transmission path of an uplink channel of the terminal separately on the basis of the uplink channel state information; and calculating, by the network side, the beams used while sending the CSI-RSs on the respective antenna ports associated with the respective transmission layers separately in downlink transmission on the basis of the angle information and the delay information of the each transmission path of the uplink channel of the terminal.

In one embodiment, obtaining, by the network side, a beam used while sending the CSI-RS on any one of antenna ports on the basis of the angle information and the delay information of the each transmission path of the uplink channel of the terminal includes: determining, by the network side, angle information and delay information corresponding to the any one of antenna ports, and the angle information is obtained through calculation by using a corresponding spatial domain basis vector, and the delay information is obtained through calculation by using a corresponding frequency domain basis vector; and calculating, by the network side, the beam used while sending the CSI-RS on the any one of antenna ports on the basis of a kronecker product of the spatial domain basis vector and the frequency domain basis vector.

In one embodiment, the spatial domain basis vector or/and the frequency domain basis vector is/are represented in any one of the following forms: an eigen-vector; a discrete fourier transform (DFT) vector; a discrete cosine transform (DCT) vector; a multinomial coefficient; and a Karhunen-Loeve Transform (KLT) vector.

In one embodiment, beams used while sending the CSI-RSs by the network side on different antenna ports associated with a same transmission layer are obtained through calculation on the basis of the same or different angle information and the same or different delay information; beams used while sending the CSI-RSs by the network side on different antenna ports associated with different transmission layers are obtained through calculation on the basis of the same or different angle information and the same or different delay information; and beams used while sending the CSI-RSs by the network side on different antenna ports in different polarization directions are obtained through calculation on the basis of the same or different angle information and the same or different delay information.

In another embodiment, a channel reciprocity-based precoding matrix configuration method includes: separately receiving, by a terminal in downlink transmission on respective antenna ports associated with respective transmission layers, a channel state information-reference signal (CSI-RS) subjected to beamforming and sent by a network side, and a beam used while sending the CSI-RS on an antenna port is obtained according to angle information and delay information determined on the basis of uplink channel state information of the terminal, and beams used while sending CSI-RSs separately to the terminal on the antenna ports are independent and different; selecting, by the terminal, K0 antenna ports on the basis of respective received CSI-RSs and calculating, by the terminal, a beam combination coefficient set corresponding to the K0 antenna ports on the basis of CSI-RSs received on the K0 antenna ports; and reporting, by the terminal, the K0 antenna ports and the beam combination coefficient set to the network side, to enable the network side to determine, as for the terminal, a precoding matrix of downlink transmission of the terminal according to the beams used while sending the CSI-RSs on the K0 antenna ports and the beam combination coefficient set.

In one embodiment, before separately receiving, by the terminal in the downlink transmission on the respective antenna ports associated with respective transmission layers, the CSI-RS subjected to beamforming and sent by the network side, the method further includes: sending, by the terminal, a sounding reference signal (SRS) to the network side, to enable the network side to execute, on the basis of the SRS, the following operations: calculating corresponding uplink channel state information on the basis of the SRS, separately determining angle information and delay information of each transmission path of an uplink channel of the terminal on the basis of the uplink channel state information, and separately calculating the beam used while sending the CSI-RS on the respective antenna ports associated with the respective transmission layers in downlink transmission on the basis of the angle information and the delay information of the each transmission path of the uplink channel of the terminal.

In one embodiment, the selecting, by the terminal, the K0 antenna ports on the basis of the respective received CSI-RSs, includes: calculating, by the terminal, a receiving power of each received CSI-RS, and selecting, by the terminal, antenna ports to which the K0 CSI-RSs with a maximum receiving power correspond; or calculating, by the terminal, a beam combination coefficient of an antenna port corresponding to each received CSI-RS, and selecting, by the terminal, antenna ports with a maximum power of the beam combination coefficient corresponding to the K0 CSI-RSs; and K0 is configured by the network side, or reported by the terminal, or configured by coordination of the terminal and the network side.

In one embodiment, the selecting, by the terminal, the K0 antenna ports and calculating, by the terminal, the beam combination coefficient set corresponding to the K0 antenna ports, include: separately calculating, by the terminal, a beam combination coefficient corresponding to each of the K0 antenna ports on the basis of the CSI-RSs received on the K0 antenna ports; and quantifying, by the terminal, obtained beam combination coefficients and reporting, by the terminal, the beam combination coefficient set to the network side.

In one embodiment, the method further includes: calculating, by the terminal, a corresponding rank indication (RI) and a corresponding channel quality indicator (CQI) on the basis of the beams used while sending the CSI-RSs on the K0 antenna ports and in combination with the beam combination coefficient set, and reporting, by the terminal, the RI and the CQI to the network side.

In yet another embodiment, a network side apparatus includes: a memory, configured to store executable instructions; and a processor, configured to read the executable instructions stored in the memory and execute the following operations: sending, in downlink transmission, a corresponding channel state information-reference signal (CSI- RS) subjected to beamforming to a terminal separately on respective antenna ports associated with respective transmission layers, and a beam used while sending the CSI-RS on an antenna port is obtained according to angle information and delay information determined on the basis of uplink channel state information of the terminal, and beams used while sending CSI-RSs separately sent to the terminal on the respective antenna ports are independent and different; receiving K0 antenna ports and a beam combination coefficient set reported by the terminal, and the K0 antenna ports are selected by the terminal on the basis of respective received CSI-RSs, the beam combination coefficient set is obtained by calculation on the basis of the CSI-RSs received on the K0 antenna ports, and K0 is an integer greater than zero; and as for the terminal, determining a precoding matrix of downlink transmission of the terminal according to the beams used while sending the CSI-RSs on the K0 antenna ports and the beam combination coefficient set.

In one embodiment, before the sending, in downlink transmission, the corresponding CSI-RS subjected to beamforming to the terminal separately on the respective antenna ports associated with the respective transmission layers, the processor is further configured to: receive a sounding reference signal (SRS) sent by the terminal; calculate corresponding uplink channel state information on the basis of the SRS; determine angle information and delay information of each transmission path of an uplink channel of the terminal separately on the basis of the uplink channel state information; and calculate the beams used while sending the CSI-RSs on the respective antenna ports associated with the respective transmission layers separately in downlink transmission on the basis of the angle information and the delay information of the each transmission path of the uplink channel of the terminal.

In one embodiment, during obtaining a beam used while sending the CSI-RS on any one of antenna ports according to the angle information and the delay information determined on the basis of the uplink channel state information of the terminal, the processor is configured to: determine angle information and delay information corresponding to any one of antenna ports, and the angle information is obtained through calculation by using a corresponding spatial domain basis vector, and the delay information is obtained through calculation by using a corresponding frequency domain basis vector; and calculate the beam used while sending the CSI-RS on the any one of antenna ports on the basis of a kronecker product of the spatial domain basis vector and the frequency domain basis vector.

In one embodiment, the spatial domain basis vector or/and the frequency domain basis vector is/are represented in any one of the following forms: an eigen-vector; a discrete fourier transform (DFT) vector; a discrete cosine transform (DCT) vector; a multinomial coefficient; and a Karhunen-Loeve Transform (KLT) vector.

In one embodiment, beams used while sending the CSI-RSs by the processor on different antenna ports associated with the same transmission layer are obtained through calculation on the basis of a same or different angle information and the same or different delay information; beams used while sending the CSI-RSs by the processor on different antenna ports associated with different transmission layers are obtained through calculation on the basis of the same or different angle information and the same or different delay information; and beams used while sending the CSI-RSs by the processor on different antenna ports in different polarization directions are obtained through calculation on the basis of the same or different angle information and the same or different delay information.

In one embodiment, a terminal includes: a memory, configured to store executable instructions; and a processor, configured to read the executable instructions stored in the memory and execute the following operations: separately receiving, in downlink transmission on respective antenna ports associated with respective transmission layers, a channel state information-reference signal (CSI-RS) subjected to beamforming and sent by a network side, and a beam used while sending the CSI-RS on an antenna port is obtained according to angle information and delay information determined on the basis of uplink channel state information of the terminal, and beams used while sending CSI-RSs separately to the terminal on the antenna ports are independent and different; selecting K0 antenna ports on the basis of respective received CSI-RSs and calculating a beam combination coefficient set corresponding to the K0 antenna ports on the basis of CSI-RSs received on the K0 antenna ports; and reporting the K0 antenna ports and the beam combination coefficient set to the network side, to enable the network side to determine, as for the terminal, a precoding matrix of downlink transmission of the terminal according to the beams used while sending the CSI-RSs on the K0 antenna ports and the beam combination coefficient set.

In one embodiment, before separately receiving, in downlink transmission on the respective antenna ports associated with respective transmission layers, the CSI-RS subjected to beamforming and sent by the network side, the processor is further configured to: send a sounding reference signal (SRS) to the network side, to enable the network side to execute, on the basis of the SRS, the following operations: calculating corresponding uplink channel state information on the basis of the SRS, separately determining angle information and delay information of each transmission path of an uplink channel of the terminal on the basis of the uplink channel state information, and separately calculating the beam used while sending the CSI-RS on the respective antenna ports associated with the respective transmission layers in downlink transmission on the basis of the angle information and the delay information of the each transmission path of the uplink channel of the terminal.

In one embodiment, during selecting the K0 antenna ports on the basis of the respective received CSI-RSs, the processor is configured to: calculate a receiving power of each received CSI-RS, and select antenna ports to which K0 CSI-RSs with a maximum receiving power correspond; or calculate a beam combination coefficient of an antenna port corresponding to each received CSI-RS, and select antenna ports with a maximum power of the beam combination coefficient corresponding to the K0 CSI-RSs; and K0 is configured by the network side, or reported by the terminal, or configured by coordination of the terminal and the network side.

In one embodiment, during selecting the K0 antenna ports and calculating the beam combination coefficient set corresponding to the K0 antenna ports, the processor is configured to: separately calculate a beam combination coefficient corresponding to each of the K0 antenna ports on the basis of the CSI-RSs received on the K0 antenna ports; and quantify obtained beam combination coefficients and report the beam combination coefficient set to a network side.

In one embodiment, the processor is further configured to: calculate a corresponding rank indication (RI) and a corresponding channel quality indicator (CQI) on the basis of the beams used while sending the CSI-RSs on the K0 antenna ports and in combination with the beam combination coefficient set, and report the RI and the CQI to the network side.

In one embodiment, a network side apparatus includes: a sending unit, configured to send, in downlink transmission, a corresponding channel state information-reference signal (CSI-RS) subjected to beamforming to a terminal separately on respective antenna ports associated with respective transmission layers, and a beam used while sending the CSI-RS on an antenna port is obtained according to angle information and delay information determined on the basis of uplink channel state information of the terminal, and beams used while sending CSI-RSs separately to the terminal on the respective antenna ports are independent and different; a receiving unit, configured to receive K0 antenna ports and a beam combination coefficient set reported by the terminal, and the K0 antenna ports are selected by the terminal on the basis of respective received CSI-RSs, the beam combination coefficient set is obtained by calculation on the basis of the CSI-RSs received on the K0 antenna ports, and K0 is an integer greater than zero; and a processing unit, configured to determine, as for the terminal, a precoding matrix of downlink transmission of the terminal according to the beams used while sending the CSI-RSs on the K0 antenna ports and the beam combination coefficient set.

In one embodiment, a terminal includes: a receiving unit, configured to separately receive, in downlink transmission on respective antenna ports associated with respective transmission layers, a channel state information-reference signal (CSI-RS) subjected to beamforming and sent by a network side, and a beam used while sending the CSI-RS on an antenna port is obtained according to angle information and delay information determined on the basis of uplink channel state information of the terminal, and beams used while sending CSI-RSs separately to the terminal on the antenna ports are independent and different; a calculating unit, configured to select K0 antenna ports on the basis of respective received CSI-RSs and calculate a beam combination coefficient set corresponding to the K0 antenna ports on the basis of CSI-RSs received on the K0 antenna ports; and a sending unit, configured to report the K0 antenna ports and the beam combination coefficient set to the network side, to enable the network side to determine, as for the terminal, a precoding matrix of downlink transmission of the terminal according to the beams used while sending the CSI-RSs on the K0 antenna ports and the beam combination coefficient set.

In one embodiment, a storage medium is provided, and instructions in the storage medium are executed by a processor, to execute any method in the embodiments.

In another embodiment, a storage medium is provided, and instructions in the storage medium are executed by a processor, to execute any method in the embodiments.

In the embodiments of the present application, in downlink transmission, the network side separately sends, on respective antenna ports associated with respective transmission layers, the CSI-RS subjected to beamforming to the terminal by using beams calculated according to the angle information and the delay information determined on the basis of the uplink channel state information, receives the K0 antenna ports and the beam combination coefficient, which are selected based on the CSI-RSs and reported by the terminal, and determines the precoding matrix for downlink transmission of the terminal according to the beams used while sending the CSI-RSs on the K0 antenna ports, and the beam combination coefficient set. In this way, both angle information reciprocity and delay information reciprocity between uplink and downlink channels can be used at the same time to directly calculate formed beams without performing SVD calculation for effective channel information of each PMI sub-band, to remarkably reduce the calculation complexity of the terminal, effectively reducing the feedback overhead of the terminal, and furthermore, also improving system performance.

DETAILED DESCRIPTION OF THE EMBODIMENTS

In order to further reduce calculation complexity of a terminal, reduce feedback overhead of the terminal and improve the system performance, in the embodiments of the present application, a network side finally calculates a precoding matrix of downlink transmission of the terminal through feedback of a small amount of auxiliary information of the terminal in combination of angle information reciprocity and delay information reciprocity between uplink and downlink channels.

In one embodiment of the present application is further described in detail with reference to accompanying drawings.

It should be understood that a solution of the present disclosure can be applied to various communication systems, for example: a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), a new radio (NR), etc.

In the embodiments of the present application, a terminal includes but is not limited to a mobile station (MS), a mobile terminal, a mobile telephone, a handset, portable equipment, etc. User equipment can communicate with one or more core networks via a radio access network (RAN), for example, the user equipment may be a mobile phone (or called a "cellular" phone), or a computer with a wireless communication function, etc. The user equipment may also be a portable or pocket or hand-held or computer built-in or vehicle-mounted mobile apparatus.

In the embodiments of the present disclosure, a network side apparatus may refer to a device communicating with a wireless terminal through one or more sectors on an air interface in an access network, or the network side apparatus may be an access point (AP). The network side apparatus may also be a network node jointly composed of a central unit (CU) and a plurality of transmission reception points (TRP) managed and controlled by the CU.

The network side apparatus may be configured to perform interconversion of a received air frame and IP grouping and serve as a router between the wireless terminal and the rest part of the access network. The rest part of the access network may include an internet protocol (IP) network. The network side apparatus may further coordinate attribute management of the air interface. For example, the network side apparatus may be a base transceiver station (BTS) in GSM or CDMA, or a base station (NodeB) in TD-SCDMA or WCDMA, or an evolutional base station (eNodeB or eNB or e-NodeB, evolutional Node B in the LTE), or a base station (gNB) in a 5G NR, or a low power node (LPN), a pico, a femto, and other small stations, which is not limited by the embodiments of the present application.

The following embodiments are described by taking the network side apparatus being gNB for example.

Figure 1:
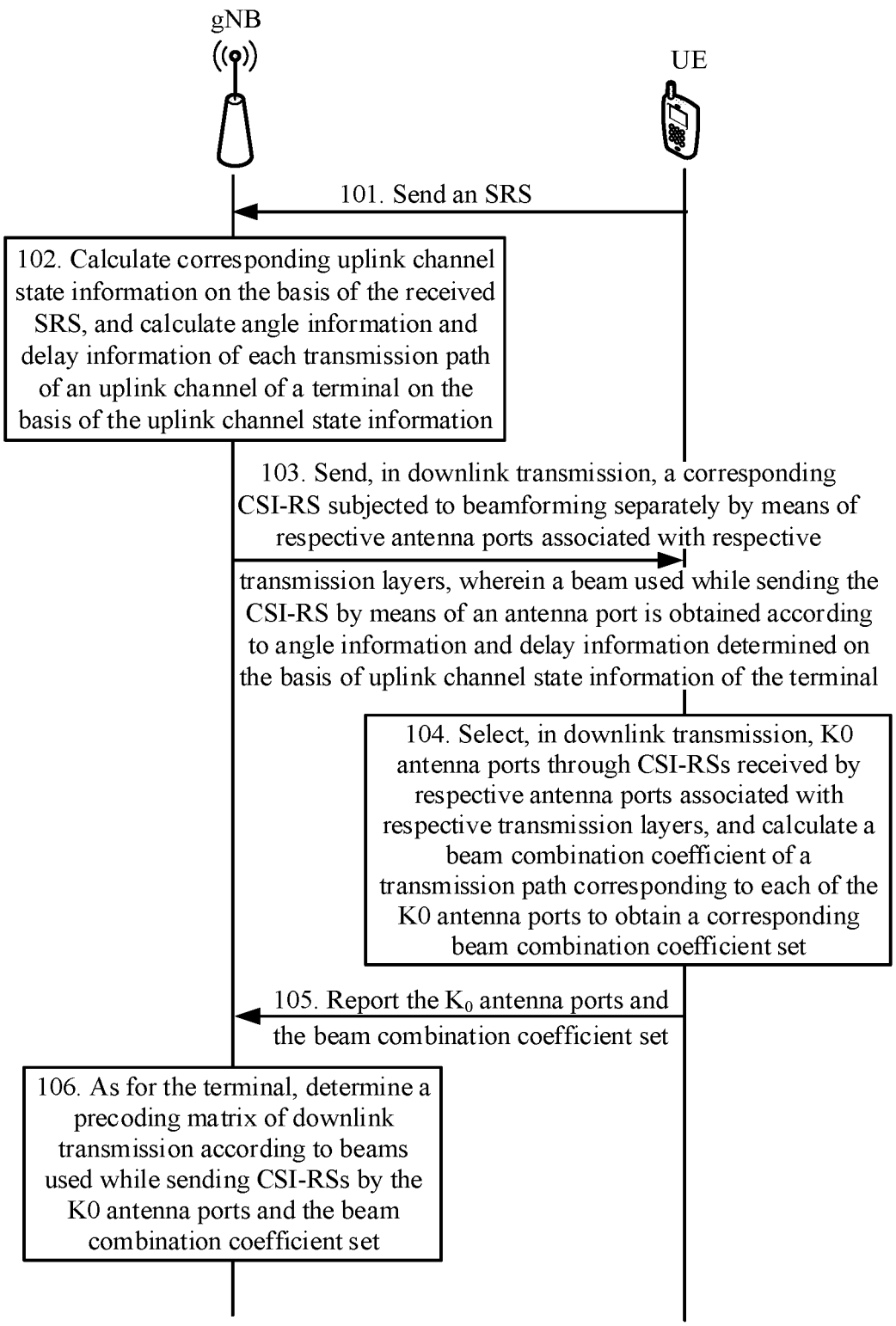
FIG. 1 is a flowchart of channel reciprocity-based precoding matrix configuration in an embodiment of the present application.

Referring to FIG. 1, in an embodiment of the present application, a detailed flow of configuring a precoding matrix of downlink transmission on the basis of channel reciprocity on a network side is as follows.

Step 101: a terminal sends a sounding reference signal (SRS) to gNB.

Step 102: gNB calculates corresponding uplink channel state information according to the received SRS and calculates angle information and delay information of each transmission path of an uplink channel of the terminal by using the uplink channel state information.

In the embodiments of the present application, the uplink channel state information may be marked as $\hat{H}^{UL}$.

In general cases, each transmission layer (namely Rank) may be associated with several antenna ports, and one antenna port corresponds to a piece of angle information and a piece of delay information. The angle information may be obtained through calculation by using a corresponding spatial domain basis vector, the delay information may be obtained through calculation by using a corresponding frequency domain basis vector, and Rank≥1.

After receiving the uplink channel state information, gNB may separately determine angle information and delay information used on respective antenna ports associated with respective transmission layers in uplink transmission of the terminal on the basis of the uplink channel state information.

Step 103: gNB sends, in downlink transmission, a corresponding CSI-RS subjected to beamforming to a terminal separately on respective antenna ports associated with respective transmission layers, and a beam used while sending the CSI-RS on an antenna port is obtained according to angle information and delay information determined on the basis of uplink channel state information of the terminal, and beams used by the CSI-RSs separately sent to the terminal by each antenna port are independent and different.

In the embodiments of the present application, gNB separately sends K CSI-RSs subjected to beamforming to the terminal on K antenna ports.

In one embodiment, beams used while sending the CSI-RSs to the terminal by a base station on an antenna port in downlink transmission are obtained through calculation on the basis of a piece of angle information and a piece of delay information corresponding to the terminal in uplink transmission, for example, firstly, a spatial domain basis vector used by a piece of angle information is calculated, and a frequency domain basis vector used by a piece of delay information is calculated, and then the beams of the antenna ports are obtained on the basis of a kronecker product of the spatial domain basis vector and the frequency domain basis vector. Certainly, this introduced calculation mode is only an example, and there are many methods for obtaining the CSI-RS in actual application, which is not described in detail one by one.

The reason why the beams may be obtained in the above mode is that the angle information and the delay information of uplink and downlink channels have reciprocity, that is, angle information and delay information to which uplink channel state information and downlink channel state information correspond are the same, thus, gNB can work out the beam used while sending the CSI-RS in downlink transmission on any one of antenna ports on the basis of a piece of angle information and a piece of delay information to which any one of antenna ports corresponds in uplink transmission.

In one embodiment, the above spatial domain basis vector or/and frequency domain basis vector may be represented in any one of the following forms: an eigen-vector; a DFT vector; a discrete cosine transform (DCT) vector; a multinomial coefficient; and a Karhunen-Loeve Transform (KLT) vector.

In another embodiment, when step 103 is executed, including: as for a case of Rank=1, or Rank>1, the beams used while sending the CSI-RSs by the base station on different antenna ports associated with the same transmission layer are obtained through calculation on the basis of the same or different angle information and the same or different delay information.

In other words, angle information corresponding to the different antenna ports associated with the same transmission layer may be the same or not, and delay information corresponding to the different antenna ports associated with the same transmission layer may be the same or not.

As for a case of Rank>1, beams used while sending the CSI-RSs by the base station on different antenna ports associated with different transmission layers are obtained through calculation on the basis of the same or different angle information and the same or different delay information.

In other words, angle information corresponding to the different antenna ports associated with the different transmission layers may be the same or not, and delay information corresponding to the different antenna ports associated with the different transmission layers may be the same or not.

As for a case of Rank=1, or Rank>1, beams used while sending the CSI-RSs by the base station on different antenna ports in different polarization directions are obtained through calculation on the basis of the same or different angle information and the same or different delay information.

In other words, angle information corresponding to the different antenna ports associated with the different polarization directions may be same or not, and delay information corresponding to the different antenna ports associated with the different polarization directions may be the same or not.

Meanwhile, as beam calculation is performed in combination with angle information and delay information, the terminal does not need to calculate delay information and feedback the delay information to the base station, to effectively reduce feedback overhead of the terminal and reduce calculation complexity.

Step 104: the terminal selects K0 antenna ports on the basis of the CSI-RSs received by respective antenna ports associated with respective transmission layers in downlink transmission, and calculates a beam combination coefficient set of each transmission path corresponding to the K0 antenna ports.

In one embodiment, after receiving K CSI-RSs subjected to beamforming on respective antenna ports associated with respective transmission layers, the terminal separately calculates a receiving power of the K CSI-RSs and selects K0 antenna ports with a maximum receiving power of the CSI-RSs and reports the selected K0 antenna ports to gNB.

Furthermore, the terminal separately calculates a beam combination coefficient, marked as $\hat{\beta}_k^{DL}$, k=0, ... , K0, corresponding to each of the K0 antenna ports on the basis of CSI-RSs received on the selected K0 antenna ports, and then quantifies these beam combination coefficients and reports the beam combination coefficient set to gNB.

Step 105: the terminal reports the K0 antenna ports and the beam combination coefficient set to the gNB.

In one embodiment, K0 may be configured by the base station, or reported by the terminal, or configured by coordination between the terminal and the base station.

Furthermore, after step 105 is executed, the terminal may continue to calculate a corresponding rank indication (RI) and a corresponding channel quality indicator (CQI) on the basis of the CSI-RSs received on the selected K0 antenna ports and in combination with the beam combination coefficient set, and report a calculation result to the base station.

Step 106: gNB determines, as for the terminal, a precoding matrix of downlink transmission of the terminal according to the beams used while sending the CSI-RSs on the K0 antenna ports and the beam combination coefficient set.

The above embodiments are further described in detail below by adopting three different application scenes.

Application scene 1: Rank=1, the network side configures K antenna ports, and different antenna ports use different beams to send one or more CSI-RSs.

In one embodiment, the terminal uses Nr antennas to send or receive a signal, one layer of data of downlink transmission is called a transmission layer x, a quantity of spatial domain basis vectors used by gNB is 2L, a quantity of frequency domain basis vectors used by gNB is Ml, l=0, ... ,2L−1, and a subscript l corresponds to a $l^{th}$ spatial domain basis vector.

A dual-polarized two-dimensional plane antenna array is installed on gNB, the antenna array is mapped into $2N_1N_2$ antenna ports, where $N_1$ represents a quantity of antenna ports in a horizontal dimension and $N_2$ represents a quantity of antenna ports in a vertical dimension direction, and a quantity of PMI sub-bands is marked as $N_3$.

So a precoding matrix used by downlink data transmission may be obtained by executing the following operations.

A1: a terminal sends an SRS to a gNB.

A2: the gNB estimates and obtains uplink channel state information $\hat{H}^{UL}$ according to the SRS.

$\hat{H}_{1,n}^{UL} \in C^{N_r \times N_1 N_2}$ represents a channel in a first polarization direction and $\hat{H}_{2,n}^{UL} \in C^{N_r \times N_1 N_2}$ represents a channel in a second polarization direction on an $n^{th}$ PMI sub-band, where n=1, ... ,$N_3$. The base station calculates a power value after compressing $\overline{H}_p^{UL}$ by using a spatial domain basis vector $v'_i$, by $v_i'^H \overline{H}_p^{UL} v'_i$ in a traversal pattern, where i=0, $N_1N_2-1$, p=0,1, $\overline{H}_p^{UL} \in C^{N_r \times N_1 N_2}$ represents an channel average value of PMI sub-band channels, namely $$\overline{H}_p^{UL} = \frac{1}{N_3} \sum_{n=1}^{N_3} \hat{H}_{p,n}^{UL} \in C^{N_r \times N_1 N_2},$$

and $v'_i$ represents an $i^{th}$ spatial domain basis vector.

After compressing $\overline{H}_p^{UL}$ by using the spatial domain basis vector, gNB selects 2L spatial domain basis vectors with the maximum power value and being orthogonal, to obtain a spatial domain basis vector matrix selected by gNB, marked as $$V = \begin{bmatrix} v_0 v_1 \cdots v_{L-1} & 0 \\ 0 & v_L v_{L+1} \cdots v_{2L-1} \end{bmatrix} \in C^{2N_1 N_2 \times 2L}.$$

A3: as for an $n^{th}$ PMI sub-band, gNB performs eigenvalue decomposition on a covariance matrix of the PMI sub-band, an eigen-vector corresponding to the maximum eigenvalue is made to be $h_n$, and a sub-band combination coefficient corresponding to the PMI sub-band is $V^H h_n \in C^{2L \times 1}$.

Similarly, a sub-band combination coefficient corresponding to each of $N_3$ PMI sub-bands may be obtained, that is, a sub-band combination coefficient set corresponding to all PMI sub-bands is represented as $W_2 \in C^{2L \times N_3}$.

A4: $[W_2]_{l,:}$ is made to represent all sub-band combination coefficients in a $l^{th}$ row in $W_2$, gNB calculates, in a traversal pattern, the following contents: corresponding compression power, marked as $f_{l,h}^H [W_2]_{l,:} f_{l,j}$, j=0, K, $N_3$−1, l=0, K, 2L−1, after compressing each coefficient in the $l^{th}$ row in each sub-band combination coefficient matrix $W_2$ by using a frequency domain basis vector $f_{l,j}$, where $f_{l,j}$ represents compression of each sub-band combination coefficient in the $l^{th}$ row in $W_2$ by using a $j^{th}$ frequency domain basis vector, and $[W_2]_{l,:}$ represents each sub-band combination coefficient of the $l^{th}$ row in $W_2$. $M_l$ frequency domain basis vectors with the maximum compression power are selected from $N_3$ candidate frequency domain basis vectors.

Likewise, frequency domain compressing is performed on each sub-band combination coefficient of all rows in $W_2$ to obtain $$K = \sum_{l=0}^{2L-1} M_l$$

frequency domain basis vectors.

A5: gNB works out beams used while sending the CSI-RSs by K antenna ports, by:

$$F_{p,k} = v_l \otimes f_{l,m_l} \in C^{N_1 N_2 N_3 \times 1},$$

$$l = 0, \ldots, 2L - 1 m_l = 0, \ldots,$$

$$M_l - 1 p = 0, 1; k = l\tilde{M} + m_l, \tilde{M} = \begin{cases} M_0, l = 0, \\ M_{l-1}, l > 0 \end{cases}.$$

In one embodiment, $f_{l,m}$ represents an $m^{th}$ frequency domain basis vector selected from $M_l$ frequency domain basis vectors, used for compressing each sub-band combination coefficient of the $l^{th}$ row in $W_2$.

A6: the terminal receives the corresponding CSI-RSs separately through the K antenna ports, calculates receiving powers of CSI-RSs on respective antenna ports separately and selects the K0 antenna ports with the maximum receiving power and reports the selected K0 antenna ports to gNB.

K0 downlink effective channels after being subjected to beamforming may be represented as:

$$\tilde{H}_{eff} = \begin{bmatrix} \tilde{H}_{0,0} & \cdots & \tilde{H}_{0,K'-1} & 0 & \cdots & 0 \\ 0 & \cdots & 0 & \tilde{H}_{1,K'} & \cdots & \tilde{H}_{1,K0-1} \end{bmatrix} \in C^{2N_r \times K0}.$$

In one embodiment, $\tilde{H}_{p,j}$, j∈{0, ... , K)}, p∈{0,1} may be obtained through estimation of the CSI-RSs received on the K0 antenna ports.

A7: the terminal performs eigenvalue decomposition on a covariance matrix of K0 downlink effective channels $\hat{H}_{eff}$, one or more eigen-vectors corresponding to the maximum eigenvalue are selected as K0 beam combination coefficients, marked as $\beta_{k'}^{DL}$, k'=0, . . . , K0, and the terminal quantifies the K0 obtained beam combination coefficients to obtain $\hat{\beta}_{k'}^{DL}$, and reports $\hat{\beta}_{k'}^{DL}$ as the beam combination coefficient set to gNB.

Furthermore, the terminal may further calculate a corresponding RI and a corresponding CQI according to the beams used while sending the CSI-RSs on the K0 antenna ports and the beam combination coefficient set, and report the RI and the CQI to gNB.

A8: gNB receives the K0 antenna ports and the beam combination coefficient set reported by the terminal and calculates a precoding matrix of downlink transmission data used on a transmission layer x, marked as:

$$W = \begin{bmatrix} \hat{F}_{0,0} & \cdots & \hat{F}_{0,K'-1} & 0 & \cdots & 0 \\ 0 & \cdots & 0 & \hat{F}_{1,K'} & \cdots & \hat{F}_{1,K0-1} \end{bmatrix} \begin{bmatrix} \hat{\beta}_0^{DL} \\ \vdots \\ \hat{\beta}_{K'-1}^{DL} \\ \hat{\beta}_{K'}^{DL} \\ \vdots \\ \hat{\beta}_{K0-1}^{DL} \end{bmatrix}.$$

In one embodiment, $\hat{F}_{p,k}$, k∈{0, . . . , K0}, p∈{0,1} represents beams used while sending the CSI-RSs on the K0 antenna ports selected by the terminal in two polarization directions.

Application scene 2: Rank=1, K antenna ports are associated, and spatial domain basis vectors used by a plurality of antenna ports in different polarization directions are the same.

In one embodiment, the terminal uses Nr antennas to send or receive a signal, one layer of data of downlink transmission is called a transmission layer x, a quantity of spatial domain basis vectors used by gNB is 2L, and a quantity of frequency domain basis vectors used by gNB is M.

A dual-polarized two-dimensional plane antenna array is installed on gNB, the antenna array is mapped into $2N_1N_2$ antenna ports, $N_1$ represents a quantity of antenna ports in the horizontal dimension and $N_2$ represents a quantity of antenna ports in the vertical dimension direction, and a quantity of PMI sub-bands is marked as $N_3$.

A precoding matrix used by downlink data transmission may be obtained by executing the following operations.

B1: a terminal sends an SRS to a gNB.

B2: the gNB estimates and obtains uplink channel state information $\hat{H}^{UL}$ according to the SRS.

$\hat{H}_{2p}^{UL} = \hat{H}_1^{UL} + \hat{H}_2^{UL}$ represents a channel in a first polarization direction and $\hat{H}_1^{UL}$, $\hat{H}_2^{UL} \in C^{N_r \times N_1 N_2}$ represents a channel in a second polarization direction on each PMI sub-band. The base station calculates, by $v_i'^H \overline{H}^{UL} v_i'$, i=0, $N_1 N_2 - 1$ in a traversal pattern, a power value after compressing $\overline{H}^{UL}$ by using a spatial domain basis vector $v_i'$, where $\overline{H}^{UL} \in C^{N_r \times N_1 N_2}$ represents a channel average value of respective PMI sub-bands in two polarization directions, and $$\overline{H}^{UL} = \frac{1}{N_3} \sum_{n=1}^{N_3} \left( \hat{H}_{1,n}^{UL} + \hat{H}_{2,n}^{UL} \right) \in C^{N_r \times N_1 N_2} v_i'$$

represents an $i^{th}$ spatial domain basis vector.

After compressing $\overline{H}_p^{UL}$ by using the spatial domain basis vector, gNB selects L spatial domain basis vectors which are the same in the two polarization directions, have the maximum power value and are orthogonal, to obtain a matrix composed of the spatial domain basis vectors selected by gNB, marked as:

$$V = \begin{bmatrix} v_0 v_1 & \cdots & v_{L-1} & & 0 & \\ & 0 & & v_L v_{L+1} & \cdots & v_{2L-1} \end{bmatrix} \in C^{2N_1 N_2 \times 2L}.$$

In one embodiment, $v_0 = v_L$, $v_1 = v_{L+1}$, . . . , $v_{L-1} = v_{2L-1}$.

B3: as for an $n^{th}$ PMI sub-band, gNB performs eigenvalue decomposition on a covariance matrix of a channel of the sub-band, makes an eigen-vector corresponding to the maximum eigenvalue be $h_n$, thus a sub-band combination coefficient corresponding to the PMI sub-band is $V^H h_n \in C^{2L \times 1}$.

Similarly, a sub-band combination coefficient corresponding to each of the N3 PMI sub-bands may be obtained, that is, a sub-band combination coefficient set corresponding to all the PMI sub-bands is represented as $W_2 \in C^{2L \times N_3}$.

B4: gNB calculates $f_j^H W_2 f_j$, j=0, . . . , $N_3 - 1$ in a traversal pattern, and selects M frequency domain basis vectors with the maximum compression power from $N_3$ candidate frequency domain basis vectors.

Therefore, gNB may obtain M frequency domain basis vectors, marked as:

$f_m$, m=0, . . . , M.

B5: gNB works out beams used while sending the CSI-RSs by the K antenna ports, by:

$F_{p,k} = v_l \otimes f_m \in C^{N_1 N_2 N_3 \times 1}$, l=0, . . . , 2L−1; m=0, . . . , M−1; p=0, 1; k=lM+m.

Then, gNB sends CSI-RSs subjected to beamforming to the terminal.

B6: the terminal receives the corresponding CSI-RSs separately through the K antenna ports, separately calculates receiving powers of the CSI-RSs on respective antenna ports, selects K0 antenna ports with the maximum receiving power, calculates a corresponding beam combination coefficient set, and reports the K0 antenna ports and the beam combination coefficient set to gNB.

Specific executing processes are the same as A6-A7, which are not described in detail here.

B7: gNB receives the K0 antenna ports and the beam combination coefficient set reported by the terminal and calculates a precoding matrix of downlink transmission data used on the transmission layer x, marked as:

$$W = \begin{bmatrix} \hat{F}_{0,0} & \cdots & \hat{F}_{0,K'-1} & 0 & \cdots & 0 \\ 0 & \cdots & 0 & \hat{F}_{1,K'} & \cdots & \hat{F}_{1,K0-1} \end{bmatrix} \begin{bmatrix} \hat{\beta}_0^{DL} \\ \vdots \\ \hat{\beta}_{K'-1}^{DL} \\ \hat{\beta}_{K'}^{DL} \\ \vdots \\ \hat{\beta}_{K0-1}^{DL} \end{bmatrix}.$$

In one embodiment, $F_{p,k}$, k∈{0, . . . , K0}, p∈{0, 1} represents beams used while sending the CSI-RSs on the K0 antenna ports selected by the terminal in the two polarization directions.

Application scene 3: Rank=2; and K antenna ports are used.

In one embodiment, the terminal uses Nr antennas to send or receive a signal, two layers of data of downlink transmission are called a transmission layer x and a transmission layer y. As for each transmission layer, a quantity of spatial domain basis vectors used by gNB is 2L, and a quantity of used frequency domain basis vectors is M'.

A dual-polarized two-dimensional plane antenna array is installed on gNB, the antenna array is mapped into $2N_1N_2$ antenna ports, $N_1$ represents a quantity of antenna ports in the horizontal dimension and $N_2$ represents a quantity of antenna ports in the vertical dimension direction, and a quantity of PMI sub-bands is marked as $N_3$.

A precoding matrix used by downlink data transmission may be obtained through calculation by the following operations.

C1: a terminal sends an SRS to gNB.

C2: as for the transmission layer x, a calculation of the spatial domain basis vectors and the frequency domain basis vectors used by gNB is the same as A2-A4 above or B2-B4 above and is not described in detail herein.

As for the transmission layer y, gNB uses spatial domain basis vectors being the same as or different from spatial domain basis vectors of the transmission layer x, and uses frequency domain basis vectors being the same as or different from frequency domain basis vectors of the transmission layer x, to calculate beams for sending data.

When gNB uses the same spatial domain basis vectors and different frequency domain basis vectors for the transmission layer x and the transmission layer y, selection of the frequency domain basis vectors by gNB as for the transmission layer y is compression of each sub-band combination coefficient to corresponding to the transmission layer y, calculation of each sub-band combination coefficient corresponding to the transmission layer y is similar to the above A3 or the above B3, where the difference between the two is that as for an $n^{th}$ PMI sub-band, gNB performs eigenvalue decomposition on the covariance matrix of the PMI sub-band, makes an eigen-vector corresponding to a second maximum eigenvalue be $h'_n$, and calculates a sub-band combination coefficient of the PMI sub-band by $V^H h'_n \in C^{2L \times 1}$.

Similarly, a sub-band combination coefficient corresponding to each of $N_3$ PMI sub-bands may be calculated.

C3: when the same spatial domain basis vectors and the same frequency domain basis vectors are used for the transmission layer x and the transmission layer y, during calculating the beam combination coefficients corresponding to the transmission layer y, the terminal performs eigenvalue decomposition on a covariance matrix of K0 downlink effective channels $\tilde{H}_{\mathit{eff}}$, and selects one or more eigenvectors corresponding to a second maximum eigenvalue as K0 beam combination coefficients, marked as $\beta_{k'}^{DL}$, k'=0, ..., K0.

C4: when different spatial domain basis vectors or different frequency domain basis vectors are used for the transmission layer x and the transmission layer y, during calculating the beam combination coefficients of the transmission layer y, a calculation mode adopted by the terminal is the same as a calculation mode of the transmission layer x.

C5: when the same spatial domain basis vectors and the same frequency domain basis vectors are used for the transmission layer x and the transmission layer y, a precoding matrix of the two transmission layers calculated by gNB may be marked as:

$$W = \begin{bmatrix} \hat{F}_{0,0} & \cdots & \hat{F}_{0,K'-1} & 0 & \cdots & 0 \\ 0 & \cdots & 0 & \hat{F}_{1,K'} & \cdots & \hat{F}_{1,K0-1} \end{bmatrix} \begin{bmatrix} \hat{\beta}_{0,0}^{DL} & \hat{\beta}_{1,0}^{DL} \\ \vdots & \vdots \\ \hat{\beta}_{0,K'-1}^{DL} & \hat{\beta}_{1,K'-1}^{DL} \\ \hat{\beta}_{0,K'}^{DL} & \hat{\beta}_{1,K'}^{DL} \\ \vdots & \vdots \\ \hat{\beta}_{0,K0-1}^{DL} & \hat{\beta}_{1,K0-1}^{DL} \end{bmatrix}.$$

In one embodiment, $\hat{F}_{p,k}$, $k \in \{0, \ldots, K0\}$, $p \in \{0,1\}$ represents beams used while sending the CSI-RSs by the K0 ports selected by the terminal in the two polarization directions, and $\hat{\beta}_{r,k'}^{DL}$, r=0,1; k'=0, ..., K0 represents beam combination coefficients corresponding to the two transmission layers.

When different spatial domain basis vectors or different frequency domain basis vectors are used for the transmission layer x and the transmission layer y, a method for calculating the precoding matrix of the two transmission layers by gNB is the same as that of the transmission layer x, that is, the precoding matrix of the transmission layer y is calculated through the following formula:

$$W = \begin{bmatrix} \hat{F}_{0,0} & \cdots & \hat{F}_{0,K'-1} & 0 & \cdots & 0 \\ 0 & \cdots & 0 & \hat{F}_{1,K'} & \cdots & \hat{F}_{1,K0} \end{bmatrix} \begin{bmatrix} \hat{\beta}_0^{DL} \\ \vdots \\ \hat{\beta}_{K'-1}^{DL} \\ \hat{\beta}_{K'}^{DL} \\ \vdots \\ \hat{\beta}_{K0-1}^{DL} \end{bmatrix}.$$

Figure 2:
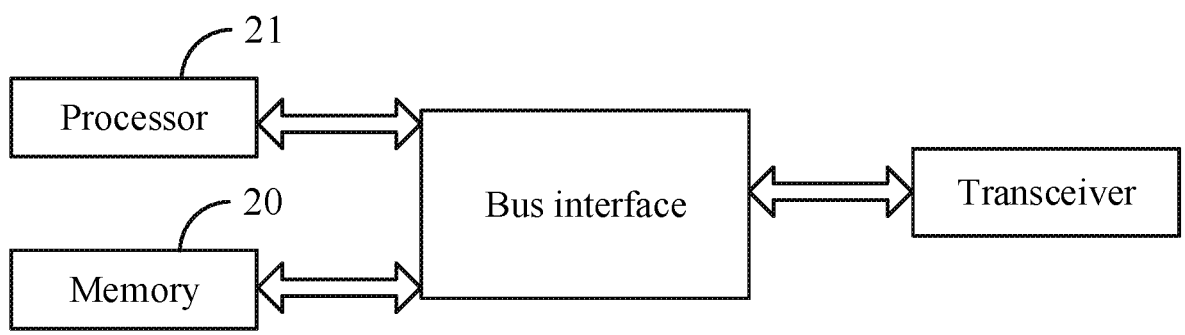
FIG. 2 is a schematic diagram of a physical architecture of a network side apparatus in an embodiment of the present application.

Based on the same embodiments, as shown in FIG. 2, an embodiment of the present application provides a network side apparatus (for example, gNB, eNB, etc.), including: a memory 20, configured to store executable instructions; and a processor 21, configured to read the executable instructions stored in the memory and execute the following operations.

In downlink transmission, a corresponding CSI-RS subjected to beamforming is sent to a terminal separately on respective antenna ports associated with respective transmission layers, and a beam used while sending the CSI-RS on an antenna port is obtained according to angle information and delay information determined on the basis of uplink channel state information of the terminal, and beams used by the CSI-RSs separately sent to the terminal by the respective antenna ports are independent and different.

K0 antenna ports and a beam combination coefficient set reported by the terminal are received, and the K0 antenna ports are selected by the terminal on the basis of respective received CSI-RSs, the beam combination coefficient set is obtained by calculation on the basis of the CSI-RSs received on the K0 antenna ports, and K0 is an integer larger than zero.

As for the terminal, a precoding matrix of downlink transmission of the terminal is determined according to the beams used while sending the CSI-RSs on the K0 antenna ports and the beam combination coefficient set.

As shown in FIG. 2, a bus architecture may include any quantity of interconnected buses and bridges, specifically linking various circuits of one or more processors represented by the processor 21 and one or more memories represented by the memory 20. The bus architecture may further link various other circuits such as a peripheral device, a voltage stabilizer and a power management circuit, which is known in the art and thus will not be further described herein. A bus interface provides an interface. A transceiver may be a plurality of components, namely including a transmitter and a receiver, and provides a unit for communicating with various other apparatuses on a transmission medium. The processor 21 is responsible for managing the bus architecture and general processing, and the memory 20 can store data used during executing of operations by the processor 21.

In one embodiment, before sending, in downlink transmission, the corresponding CSI-RS subjected to beamforming to the terminal separately on respective antenna port associated with respective transmission layers, the processor 21 is further configured to: receive an SRS sent by the terminal; calculate corresponding uplink channel state information on the basis of the SRS; determine angle information and delay information of each transmission path of an uplink channel of the terminal separately on the basis of the uplink channel state information; and calculate beams used while sending the CSI-RSs on respective antenna ports associated with respective transmission layers separately in downlink transmission on the basis of the angle information and the delay information of each transmission path of the uplink channel of the terminal.

In one embodiment, during obtaining a beam used while sending the CSI-RS on any one of antenna ports according to the angle information and the delay information determined on the basis of the uplink channel state information of the terminal, the processor 21 is configured to: determine angle information corresponding to the any one of antenna ports and delay information corresponding to the any one of antenna ports, and the angle information is obtained through calculation by using a corresponding spatial domain basis vector, and the delay information is obtained through calculation by using a corresponding frequency domain basis vector; and calculate and obtain the beam used while sending the CSI-RS on any one of antenna ports on the basis of a kronecker product of the spatial domain basis vector and the frequency domain basis vector.

In one embodiment, the spatial domain basis vector or/and the frequency domain basis vector is/are represented in any one of the following forms: an eigen-vector; a discrete fourier transform (DFT) vector; a discrete cosine transform (DCT) vector; a multinomial coefficient; and a Karhunen-Loeve Transform (KLT) vector.

In one embodiment, beams used while sending the CSI-RSs by the processor 21 on different antenna ports associated with the same transmission layer are obtained through calculation on the basis of the same or different angle information and the same or different delay information; beams used while sending the CSI-RSs by the processor 21 on different antenna ports associated with different transmission layers are obtained through calculation on the basis of the same or different angle information and the same or different delay information; and the beams used while sending the CSI-RSs by the processor 21 on different antenna ports in different polarization directions are obtained through calculation on the basis of the same or different angle information and the same or different delay information.

Figure 3:
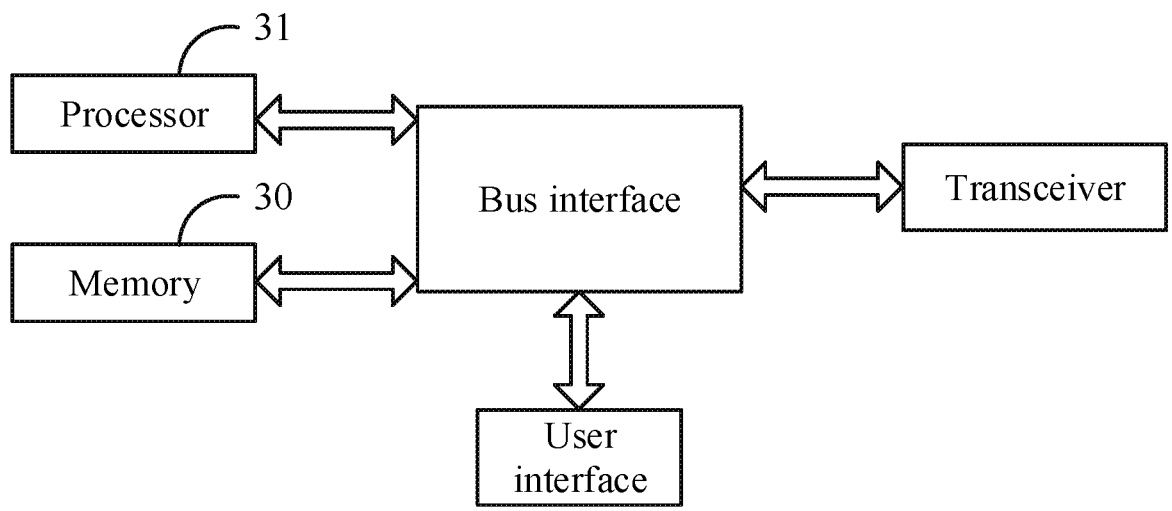
FIG. 3 is a schematic diagram of a physical architecture of a terminal in an embodiment of the present application.

Based on the same embodiments, as shown in FIG. 3, an embodiment of the present application provides a terminal, including: a memory 30, configured to store executable instructions; and a processor 31, configured to read the executable instructions stored in the memory and execute the following operations.

Through respective antenna ports associated with respective transmission layers in downlink transmission, a CSI-RS subjected to beamforming and sent by a network side is separately received, and a beam used while sending the CSI-RS on an antenna port is obtained according to angle information and delay information determined on the basis of uplink channel state information of the terminal, and beams used by the CSI-RSs sent to the terminal separately by respective antenna ports are independent and different.

K0 antenna ports are selected on the basis of respective received CSI-RSs and a beam combination coefficient set corresponding to the K0 antenna ports is calculated on the basis of CSI-RSs received on the K0 antenna ports.

The K0 antenna ports and the beam combination coefficient set are reported to the network side, and the network side determines, as for the terminal, a precoding matrix of downlink transmission of the terminal according to beams used while sending the CSI-RSs on the K0 antenna ports and the beam combination coefficient set.

As shown in FIG. 3, a bus architecture may include any quantity of interconnected buses and bridges, specifically linking various circuits of one or more processors represented by the processor 31 and memories represented by the memory 30. The bus architecture may further link various other circuits such as a peripheral device, a voltage stabilizer and a power management circuit, which is known in the art and thus will not be further described herein. A bus interface provides an interface. A transceiver may be a plurality of components, namely including a transmitter and a receiver, and provides a unit for communicating with various other apparatuses on a transmission medium. As for different user equipment, a user interface may also be an interface capable of externally connected or internally connected with needed devices, the connected devices include but are not limited to a keypad, a display, a speaker, a microphone, a joystick, etc.

The processor 31 is responsible for managing the bus architecture and general processing, and the memory 30 can store data used during executing of operations by the processor 31.

In one embodiment, before separately receiving, through respective antenna ports associated with respective transmission layers in downlink transmission, the CSI-RS subjected to beamforming and sent by the network side, the processor 31 is further configured to: send an SRS to the network side and the network side executes, on the basis of the SRS, the following operations: calculating corresponding uplink channel state information on the basis of the SRS, separately determining angle information and delay information of each transmission path of an uplink channel of the terminal on the basis of the uplink channel state information, and separately calculating the beam used while sending the CSI-RS on the respective antenna ports associated with the respective transmission layers in downlink transmission on the basis of the angle information and the delay information of the each transmission path of the uplink channel of the terminal.

In one embodiment, during selecting the K0 antenna ports on the basis of the respective received CSI-RSs, the processor 31 is configured to: calculate a receiving power of each received CSI-RS, and select antenna ports to which K0 CSI-RSs with a maximum receiving power correspond; or calculate a beam combination coefficient of an antenna port corresponding to each received CSI-RS, and select antenna ports with a maximum power of the beam combination coefficient corresponding to the K0 CSI-RSs; and K0 is configured by the network side, or reported by the terminal, or configured by coordination of the terminal and the network side.

In one embodiment, during selecting the K0 antenna ports and calculating the beam combination coefficient set corresponding to the K0 antenna ports, the processor 31 is configured to: separately calculate a beam combination coefficient corresponding to each of the K0 antenna ports on the basis of the CSI-RSs received on the K0 antenna ports; and quantify obtained beam combination coefficients and report the beam combination coefficient set to the network side.

In one embodiment, the processor 31 is further configured to: calculate a corresponding RI and a corresponding CQI on the basis of the beams used while sending the CSI-RSs on the K0 antenna ports and in combination with the beam combination coefficient set, and report the RI and the CQI to the network side.

Figure 4:
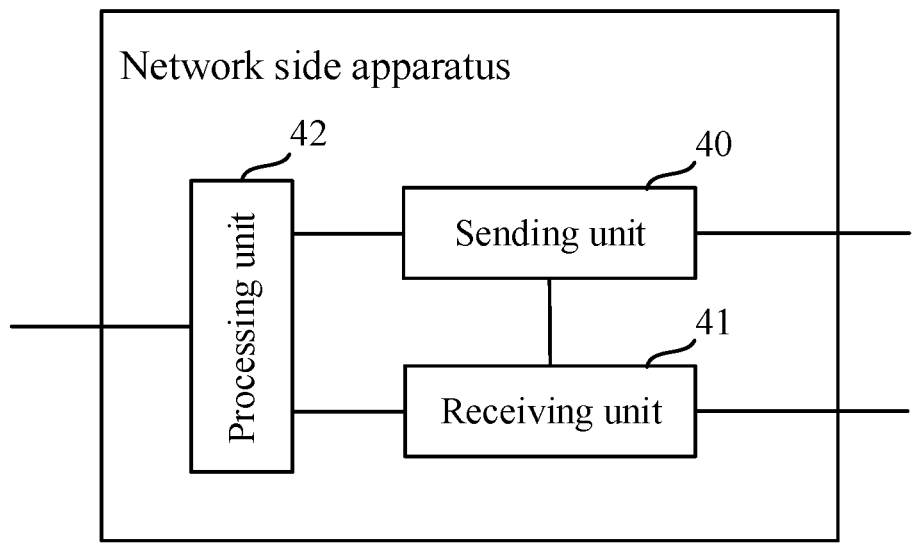
FIG. 4 is a schematic diagram of a logical architecture of a base station of a network side apparatus in an embodiment of the present application.

Based on the same embodiments, as shown in FIG. 4, an embodiment of the present application provides a network side, including: a sending unit 40, configured to send, in downlink transmission, a corresponding CSI-RS subjected to beamforming to a terminal separately on respective antenna ports associated with respective transmission layers, and a beam used while sending the CSI-RS on an antenna port is obtained according to angle information and delay information determined on the basis of uplink channel state information of the terminal, and beams used while sending CSI-RSs separately to the terminal on the respective antenna ports are independent and different; a receiving unit 41, configured to receive K0 antenna ports and a beam combination coefficient set reported by the terminal, and the K0 antenna ports are selected by the terminal on the basis of respective received CSI-RSs, the beam combination coefficient set is obtained by calculation on the basis of the CSI-RSs received on the K0 antenna ports, and K0 is an integer greater than zero; and a processing unit 42, configured to determine, as for the terminal, a precoding matrix of downlink transmission of the terminal according to the beams used while sending the CSI-RSs on the K0 antenna ports and the beam combination coefficient set.

The above sending unit 40, receiving unit 41 and processing unit 42 realize any method executed by the network side in the above embodiments.

Figure 5:
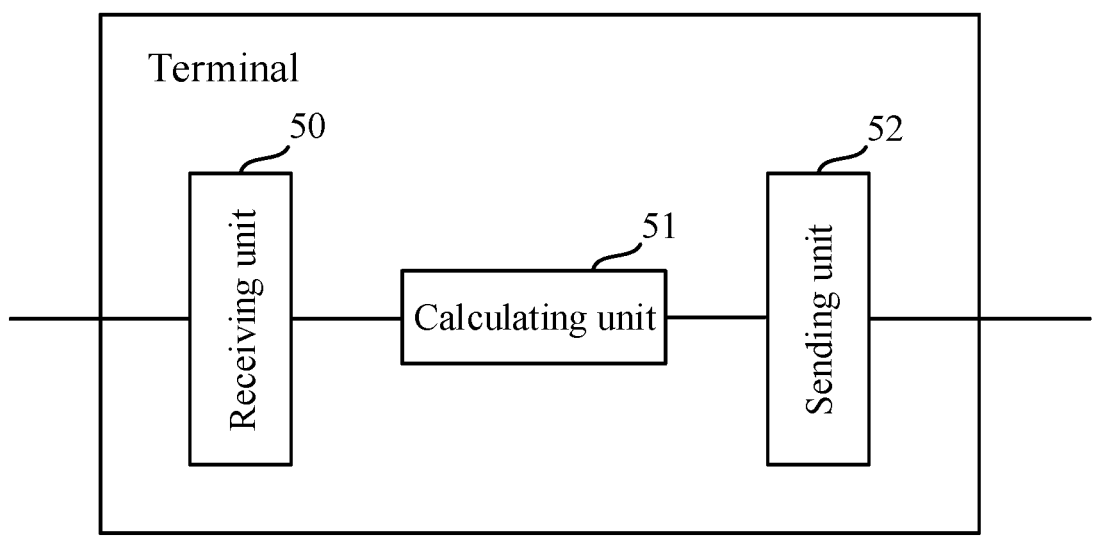
FIG. 5 is a schematic diagram of a logical architecture of a terminal in an embodiment of the present application.

Based on the same embodiments, as shown in FIG. 5, an embodiment of the present application provides a terminal, including: a receiving unit 50, configured to separately receive, in downlink transmission on respective antenna ports associated with respective transmission layers, a channel state information-reference signal (CSI-RS) subjected to beamforming and sent by a base station, and a beam used while sending the CSI-RS on an antenna port is obtained according to angle information and delay information determined on the basis of uplink channel state information of the terminal, and beams used while sending CSI-RSs separately to the terminal on the antenna ports are independent and different; a calculating unit 51, configured to select K0 antenna ports on the basis of respective received CSI-RSs and calculate a beam combination coefficient set corresponding to the K0 antenna ports on the basis of CSI-RSs received on the K0 antenna ports; and a sending unit 52, configured to report the K0 antenna ports and the beam combination coefficient set to the base station, to enable the base station to determine, as for the terminal, a precoding matrix of downlink transmission of the terminal according to the beams used while sending the CSI-RSs on the K0 antenna ports and the beam combination coefficient set.

The above receiving unit 50, calculating unit 51 and sending unit 52 mutually cooperate to realize any method executed by the terminal in any of the above embodiments.

Based on the same embodiments, a storage medium is provided, and when one or more instructions in the storage medium are executed by a processor, the processor can execute any method executed by the above base station.

Based on the same embodiments, a storage medium is provided, and when one or more instructions in the storage medium are executed by a processor, the processor can execute any method executed by the above terminal.

In the embodiments of the present application, in downlink transmission, the network side separately sends, on respective antenna ports associated with respective transmission layers, the CSI-RS subjected to beamforming to the terminal by using beams calculated according to the angle information and the delay information determined on the basis of the uplink channel state information, receives the K0 antenna ports and the beam combination coefficient, which are selected based on the CSI-RSs and reported by the terminal, and determines the precoding matrix for downlink transmission of the terminal according to the beams used while sending the CSI-RSs on the K0 antenna ports, and the beam combination coefficient set. In this way, both angle information reciprocity and delay information reciprocity between uplink and downlink channels can be used at the same time to directly calculate formed beams without performing SVD calculation for effective channel information of each PMI sub-band, to remarkably reduce the calculation complexity of the terminal, effectively reducing the feedback overhead of the terminal, and furthermore, also improving system performance.

The embodiments of the present application may be provided as a method, a system, or a computer program product. Therefore, the present application can adopt a form of a complete hardware embodiment, a complete software embodiment or an embodiment combined with software and hardware. Besides, the present application can adopt a form of a computer program product implemented on one or more computer applicable storage media (including but not limited to a disk memory, a CD-ROM, an optical memory, etc.) containing a computer applicable program code.

The present application is described with reference to a flowchart and/or a block diagram of a method, a device (system) and a computer program product according to embodiments of the present application. It should be understood that each flow and/or block in the flowchart and/or block diagram, and combination of flows and/or blocks in the flowchart and/or the block diagram can be implemented on computer program instructions. These computer program instructions can be provided for a processor of a general-purpose computer, a special-purpose computer, an embedded processor or other programmable data processing devices to generate a machine, and an apparatus configured to realize functions specified in one or more flows in the flowchart and/or one or more blocks in the block diagram can be generated on the instruction executed by the processor of the computer or other programmable data processing devices.

These computer program instructions can be stored in a computer readable memory capable of guiding the computer or other programmable data processing devices to work in a specific mode, and the instruction stored in the computer readable memory generates a manufacture including an instruction apparatus, and the instruction apparatus realizes the functions specified in one or more flows in the flowchart and/or one or more blocks in the block diagram.

These computer program instructions may be also loaded onto the computer or other programmable data processing devices, and a series of operation steps are executed on the computer or other programmable devices to generate processing implemented by the computer, thus the instruction executed on the computer or other programmable devices provides steps used for realizing the functions specified in one or more flows of the flowchart and/or one or more blocks of the block diagram.

Though some embodiments of the present application are already described. So the appended claims intend to be constructed as including the embodiments and all the changes and modifications falling within the scope of the present application.

Apparently, various changes and transformations for the embodiments of the present application can be made without departing from the scope of the embodiments of the present application. In this case, if these changes and transformations of the embodiments of the present application fall within the scope of the claims and their equivalents of the present application, the present application also intends to contain these changes and transformations.

What is claimed is:

1. A channel reciprocity-based precoding matrix determination method, comprising:
   receiving, by a network side, a sounding reference signal (SRS) sent by a terminal;
   sending, by the network side, a channel state information-reference signal (CSI-RS) subjected to beamforming to the terminal on respective antenna ports associated with respective transmission layers;
   receiving, by the network side, information about K0 antenna ports and a beam combination coefficient set reported by the terminal, wherein the K0 is configured by the network side; and
   determining, by the network side, a precoding matrix of downlink transmission of the terminal according to the beams used while sending the CSI-RSs on the K0 antenna ports and the beam combination coefficient set.

2. The method according to claim 1, wherein before the sending, by the network side, the corresponding CSI-RS subjected to beamforming to the terminal on the respective antenna ports associated with the respective transmission layers, the method comprises:
   calculating, by the network side, uplink channel state information on the basis of the SRS;
   determining, by the network side, angle information and delay information of each transmission path of an uplink channel of the terminal on the basis of the uplink channel state information; and
   calculating, by the network side, the beams used while sending the CSI-RSs on the respective antenna ports associated with the respective transmission layers on the basis of the angle information and the delay information of the each transmission path of the uplink channel of the terminal.

3. The method according to claim 2, wherein the calculating, by the network side, the beams used while sending the CSI-RSs on the respective antenna ports associated with the respective transmission layers on the basis of the angle information and the delay information of the each transmission path of the uplink channel of the terminal, comprises:
   determining, by the network side, angle information and delay information corresponding to the respective antenna ports, wherein the angle information is obtained through calculation by using a corresponding spatial domain basis vector, and the delay information is obtained through calculation by using a corresponding frequency domain basis vector; and
   calculating, by the network side, the beams used while sending the CSI-RS on the respective antenna ports on the basis of a kronecker product of the spatial domain basis vector and the frequency domain basis vector.

4. The method according to claim 3, wherein the spatial domain basis vector or/and the frequency domain basis vector is/are represented in any one of the following forms:
   an eigen-vector;
   a discrete fourier transform (DFT) vector;
   a discrete cosine transform (DCT) vector;
   a multinomial coefficient; and
   a Karhunen-Loeve Transform (KLT) vector.

5. The method according to claim 2, wherein beams used while sending the CSI-RSs by the network side on different antenna ports associated with a same transmission layer are obtained through calculation on the basis of the same or different angle information and the same or different delay information;
   beams used while sending the CSI-RSs by the network side on different antenna ports associated with different transmission layers are obtained through calculation on the basis of the same or different angle information and the same or different delay information; and
   beams used while sending the CSI-RSs by the network side on different antenna ports in different polarization directions are obtained through calculation on the basis of the same or different angle information and the same or different delay information.

6. A network side apparatus, comprising:
   a memory, configured to store executable instructions; and
   a processor, configured to read the executable instructions stored in the memory and execute the method of claim 1.

7. The network side apparatus according to claim 6, wherein before the sending the CSI-RS subjected to beamforming to the terminal on the respective antenna ports associated with the respective transmission layers, the processor is configured to:
   calculate uplink channel state information on the basis of the SRS;
   determine angle information and delay information of each transmission path of an uplink channel of the terminal on the basis of the uplink channel state information; and
   calculate the beams used while sending the CSI-RSs on the respective antenna ports associated with the respective transmission layers on the basis of the angle information and the delay information of the each transmission path of the uplink channel of the terminal.

8. The network side apparatus according to claim 7, wherein the processor configured to calculate the beams used while sending the CSI-RSs on the respective antenna ports associated with the respective transmission layers on the basis of the angle information and the delay information of the each transmission path of the uplink channel of the terminal is configured to:
   determine angle information and delay information corresponding to the respective antenna ports, wherein the angle information is obtained through calculation by using a corresponding spatial domain basis vector, and the delay information is obtained through calculation by using a corresponding frequency domain basis vector; and calculate the beams used while sending the CSI-RS on the respective antenna ports on the basis of a kronecker product of the spatial domain basis vector and the frequency domain basis vector.

9. The network side apparatus according to claim 8, wherein the spatial domain basis vector or/and the frequency domain basis vector is/are represented in any one of the following forms:
an eigen-vector;
a discrete fourier transform (DFT) vector;
a discrete cosine transform (DCT) vector;
a multinomial coefficient; and
a Karhunen-Loeve Transform (KLT) vector.

10. The network side apparatus according to claim 7, wherein beams used while sending the CSI-RSs by the processor on different antenna ports associated with a same transmission layer are obtained through calculation on the basis of the same or different angle information and the same or different delay information;
beams used while sending the CSI-RSs by the processor on different antenna ports associated with different transmission layers are obtained through calculation on the basis of the same or different angle information and the same or different delay information; and
beams used while sending the CSI-RSs by the processor on different antenna ports in different polarization directions are obtained through calculation on the basis of the same or different angle information and the same or different delay information.

11. A channel reciprocity-based precoding matrix determination method, comprising:
sending, by a terminal, a sounding reference signal (SRS) to a network side;
receiving, by the terminal on respective antenna ports associated with respective transmission layers, a channel state information-reference signal (CSI-RS) subjected to beamforming and sent by the network side; and
reporting, by the terminal, information about K0 antenna ports and beam combination coefficient set to the network side, wherein beams used while sending CSI-RSs on the K0 antenna ports and the beam combination coefficient set are configured for the network side to determine a precoding matrix of downlink transmission of the terminal; wherein the K0 is configured by the network side.

12. The method according to claim 11, wherein before receiving, by the terminal on the respective antenna ports associated with respective transmission layers, the CSI-RS subjected to beamforming and sent by the network side,
the SRS is configured for the network side to execute the following operations:
calculating corresponding uplink channel state information on the basis of the SRS, determining angle information and delay information of each transmission path of an uplink channel of the terminal on the basis of the uplink channel state information, and calculating the beams used while sending the CSI-RSs on the respective antenna ports associated with the respective transmission layers on the basis of the angle information and the delay information of the each transmission path of the uplink channel of the terminal.

13. The method according to claim 11, further comprising:
calculating, by the terminal, a receiving power of each received CSI-RS, and selecting, by the terminal, antenna ports to which K0 CSI-RSs with a maximum receiving power correspond; or
calculating, by the terminal, a beam combination coefficient of an antenna port corresponding to each received CSI-RS, and selecting, by the terminal, antenna ports with a maximum power of the beam combination coefficient corresponding to K0 CSI-RS.

14. The method according to claim 11, further comprising:
calculating, by the terminal, a beam combination coefficient corresponding to each of the K0 antenna ports on the basis of the CSI-RSs received on the K0 antenna ports; and
quantifying, by the terminal, obtained beam combination coefficients and reporting, by the terminal, the beam combination coefficient set to the network side.

15. The method according to claim 14, further comprising:
calculating, by the terminal, a corresponding rank indication (RI) and a corresponding channel quality indicator (CQI) on the basis of the beams used while sending the CSI-RSs on the K0 antenna ports and in combination with the beam combination coefficient set, and
reporting, by the terminal, the RI and the CQI to the network side.

16. A terminal, comprising:
a memory, configured to store executable instructions; and
a processor, configured to read the executable instructions stored in the memory and execute the following operations:
sending a sounding reference signal (SRS) to a network side;
receiving on respective antenna ports associated with respective transmission layers, a channel state information-reference signal (CSI-RS) subjected to beamforming and sent by the network side; and
reporting information about K0 antenna ports and beam combination coefficient set to the network side, wherein beams used while sending CSI-RSs on the K0 antenna ports and the beam combination coefficient set are configured for the network side to determine a precoding matrix of downlink transmission of the terminal;
wherein the K0 is configured by the network side.

17. The terminal according to claim 16, wherein before receiving, by the terminal on the respective antenna ports associated with respective transmission layers, the CSI-RS subjected to beamforming and sent by the network side,
the SRS is configured for the network side to execute the following operations:
calculating corresponding uplink channel state information on the basis of the SRS, determining angle information and delay information of each transmission path of an uplink channel of the terminal on the basis of the uplink channel state information, and calculating the beams used while sending the CSI-RSs on the respective antenna ports associated with the respective transmission layers on the basis of the angle information and the delay information of the each transmission path of the uplink channel of the terminal.

18. The terminal according to claim 16, wherein the processor is further configured to:
calculate a receiving power of each received CSI-RS, and select antenna ports to which K0 CSI-RSs with a maximum receiving power correspond; or calculate a beam combination coefficient of an antenna port corresponding to each received CSI-RS, and select antenna ports with a maximum power of the beam combination coefficient corresponding to K0 CSI-RSs.

19. The terminal according to claim 16, wherein the processor is further configured to:
   calculate a beam combination coefficient corresponding to each of the K0 antenna ports on the basis of the CSI-RSs received on the K0 antenna ports; and
   quantify obtained beam combination coefficients and report the beam combination coefficient set to the network side.

20. The terminal according to claim 19, wherein the processor is further configured to:
   calculate a corresponding rank indication (RI) and a corresponding channel quality indicator (CQI) on the basis of the beams used while sending the CSI-RSs on the K0 antenna ports and in combination with the beam combination coefficient set, and
   report the RI and the CQI to the network side.

* * * * *